(No Model.)
J. C. HUGGINS, Dec'd.
F. M. WILSON, Administrator.
CHAISE.
No. 499,738. Patented June 20, 1893.
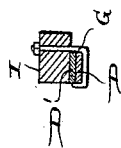
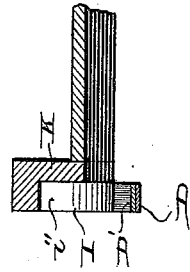
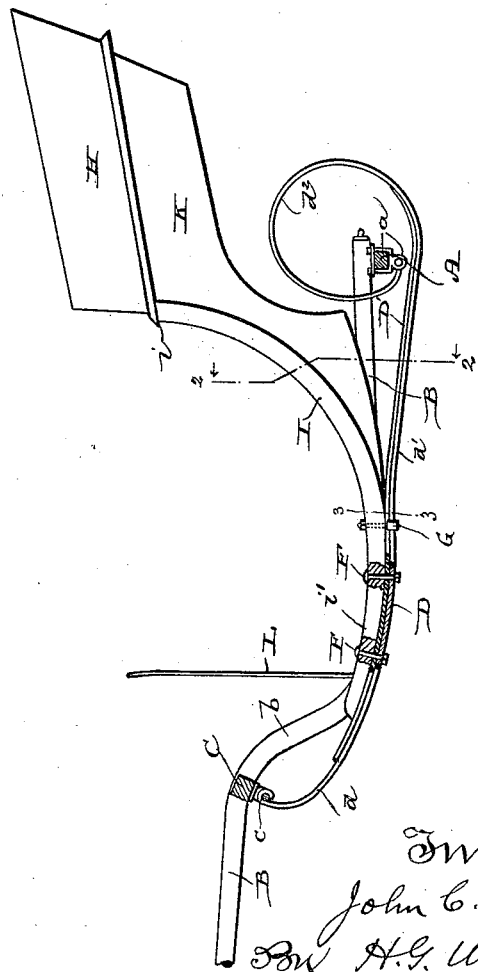
Witnesses
Geo. W. Young.
Jno. L. Condron.
Inventor
John C. Huggins.
By H. G. Underwood
Attorney

UNITED STATES PATENT OFFICE.

JOHN C. HUGGINS, OF RACINE, WISCONSIN; FREDERICK M. WILSON ADMINISTRATOR OF SAID HUGGINS, DECEASED.

CHAISE.

SPECIFICATION forming part of Letters Patent No. 499,738, dated June 20, 1893.

Application filed August 4, 1890. Serial No. 360,850. (No model.)

*To all whom it may concern:*

Be it known that I, JOHN C. HUGGINS, of Racine, in the county of Racine, and in the State of Wisconsin, have invented certain new and useful Improvements in Chaises; and I do hereby declare that the following is a full, clear, and exact description thereof.

My invention relates to that class of two-wheeled vehicles generally known as chaises; and has for its objects to provide such a vehicle in which the body shall be sufficiently low and unobstructed as to be easy of access, the seat firmly supported, and the longitudinal springs constructed and arranged as to form comparatively stiff hangers in front of said seat supports and have the greater portion of their elasticity in rear of said body, whereby the latter is insured against unpleasant rocking motion, without interference with the vertical motion of the said body and seat necessary to comfortable riding. These objects I attain by the construction and arrangement of parts to be hereinafter described with reference to the accompanying drawings and subsequently claimed.

In the drawings: Figure 1 represents a side elevation partly in section of a portion of a chaise constructed according to my invention, and Figs. 2 and 3, detail sectional views respectively taken on lines 2—2 and 3—3 of Fig. 1.

Referring by letter to the drawings A represents the axle and B one of the shafts of the vehicle. The rear ends of the shafts are preferably rested upon the upper side of the axle and secured thereto by clips or other suitable means. About midway of their length, the shafts are bent upward and forward as shown at $b$, and at the upper termini of these bends said shafts are connected to a cross-bar C in any suitable manner.

At each side of the vehicle, a longitudinal spring D has its front end shackled or otherwise suitably secured to the cross-bar C, as shown at $c$, and extends thence downward and rearward in a form approximate to a quarter circle, as indicated by $d$, this portion of said spring being highly tempered so as to move back and forth as the body of the vehicle moves up and down. From the portion $d$ the spring extends rearward in nearly a straight line as indicated by $d'$, the rear portion of said spring being curved up over and clear of the adjacent axle B, to form an elastic loop $d^2$ that is finally pivotally secured to the under side of said axle by a shackle $a$, or other suitable means, so as to bring the body K nearer to the aforesaid axle and thus reduce the horse motion of the vehicle. If found desirable, one or more leaves D' may be arranged on the spring D to strengthen the latter.

By bolts F, or other suitable means, a support I, connected at $i$ to a seat H, is secured to each of the springs D, and in order to prevent side motion of the seat supports and vehicle body K, secured thereto, I employ J-shaped bolts or clips G, as best illustrated in Fig. 3.

In order to make the body K easy of access, the seat supports I are shaped so as to have their forward portions $i'$ approximately on the same horizontal plane with the lower rear portions of the shafts, and rest for a considerable length on the springs D to which they are bolted and clipped, as above described, and from the clips G said supports extend rearward and upward to meet the seat. The seat supports are preferably in the form of an arc of a circle, as shown in Fig. 1, but it is obvious that I may make them in angular form and accomplish the same result.

By means of the construction and arrangement of parts above described, the springs D have their greatest elasticity in rear of the clips G, and also in rear of the vehicle body, and axle whereby this vehicle body is free to yield in a vertical direction only, the front ends of said springs being made elastic for the purpose of dividing the strain caused by the vertical play of said vehicle body, otherwise these front ends of the springs are nothing more or less than rigid hangers that prevent a rocking motion of the aforesaid vehicle body.

The vehicle body is provided with the usual dash L, the latter being held in place by any suitable means.

Having thus described my invention, what I claim as new, and desire to secure by Letters Patent, is—

1. In a chaise, the combination of the axle, cross-bar, seat-supports, and longitudinal springs rigidly secured to the under side of forwardly extended portions of the seat-supports, when these springs have curved front ends connected to said cross-bar and their rear ends curled up from the rear of the seat-supports and axle to come under the latter and be pivotally secured to the under side of the same, substantially as set forth.

2. In a chaise, the combination of seat supports having forwardly and upwardly extended portions, longitudinal springs rigidly secured to the lower portion of the seat supports and having highly tempered quarter circle front ends connected to the cross-bar of the vehicle, and the rear portions of the springs extended back of the vehicle body to curve up over the vehicle axle and connect with the under side of the same entirely free of said seat supports, substantially as set forth.

In testimony that I claim the foregoing I have hereunto set my hand, at Milwaukee, in the county of Milwaukee and State of Wisconsin, in the presence of two witnesses.

JOHN C. HUGGINS.

Witnesses:
N. E. OLIPHANT,
WM. KLUG.